(12) United States Patent
Choi et al.

(10) Patent No.: US 9,306,633 B2
(45) Date of Patent: Apr. 5, 2016

(54) WIRELESS POWER TRANSMISSION APPARATUS AND SYSTEM FOR WIRELESS POWER TRANSMISSION THEREOF

(75) Inventors: Sung-jin Choi, Anyang-si (KR); Kang-hyun Yi, Oga-myeon (KR); Eun-il Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 613 days.

(21) Appl. No.: 13/342,362

(22) Filed: Jan. 3, 2012

(65) Prior Publication Data

US 2012/0169278 A1 Jul. 5, 2012

Related U.S. Application Data

(60) Provisional application No. 61/429,294, filed on Jan. 3, 2011.

(30) Foreign Application Priority Data

Mar. 8, 2011 (KR) ........................ 10-2011-0020504

(51) Int. Cl.
*H02J 7/00* (2006.01)
*H04B 5/00* (2006.01)
*H02J 5/00* (2006.01)

(52) U.S. Cl.
CPC .............. *H04B 5/0037* (2013.01); *H02J 5/005* (2013.01); *H04B 5/0081* (2013.01); *H04B 5/0093* (2013.01)

(58) Field of Classification Search
CPC .................... H02J 7/025; H04B 5/00

USPC .......................................... 320/107–108, 137
See application file for complete search history.

(56) References Cited

U.S. PATENT DOCUMENTS

| | | | |
|---|---|---|---|
| 6,437,685 B2 | 8/2002 | Hanaki | |
| 7,451,839 B2 | 11/2008 | Perlman | |
| 7,688,036 B2 * | 3/2010 | Yarger et al. | 320/137 |
| 7,787,411 B2 | 8/2010 | Lum et al. | |
| 8,164,222 B2 | 4/2012 | Baarman | |
| 8,248,028 B2 * | 8/2012 | Toya et al. | 320/108 |
| 8,378,524 B2 | 2/2013 | Mita | |

(Continued)

FOREIGN PATENT DOCUMENTS

| | | |
|---|---|---|
| CN | 101828157 A | 9/2010 |
| JP | 2008301554 A | 12/2008 |

(Continued)

OTHER PUBLICATIONS

Bingnan Wang, Tamotsu Nishino, Koon Hoo Teo, Wireless Power Transmission Efficiency Enhancement with Metamaterials, Mitsubishi electric research laboratories, Sep. 2010.*

(Continued)

*Primary Examiner* — Drew A Dunn
*Assistant Examiner* — Zixuan Zhou
(74) *Attorney, Agent, or Firm* — Sughrue Mion, PLLC (57) ABSTRACT

A wireless power transmission apparatus and a wireless power transmission system are provided. The wireless power transmission apparatus includes a main body; and a support which is disposed on a side surface of the main body, wherein the main body includes a transmission resonator unit which generates a first magnetic field of a horizontal direction with respect a ground surface and a second magnetic field of a vertical direction with respect to the ground surface.

37 Claims, 7 Drawing Sheets

(56) References Cited

U.S. PATENT DOCUMENTS

| | | |
|---|---|---|
| 8,396,021 B2 | 3/2013 | Lum et al. |
| 2005/0116683 A1* | 6/2005 | Cheng et al. ............. 320/108 |
| 2006/0219448 A1 | 10/2006 | Grieve et al. |
| 2006/0256819 A1 | 11/2006 | Lum et al. |
| 2006/0266564 A1 | 11/2006 | Perlman |
| 2007/0178945 A1 | 8/2007 | Cook et al. |
| 2008/0014897 A1 | 1/2008 | Cook et al. |
| 2009/0106567 A1* | 4/2009 | Baarman ............. 713/300 |
| 2009/0140690 A1 | 6/2009 | Jung |
| 2010/0052431 A1 | 3/2010 | Mita |
| 2010/0197404 A1 | 8/2010 | Lum et al. |
| 2010/0201189 A1* | 8/2010 | Kirby et al. ............. 307/9.1 |
| 2010/0259109 A1 | 10/2010 | Sato |
| 2010/0277121 A1* | 11/2010 | Hall et al. ............. 320/108 |
| 2010/0290215 A1 | 11/2010 | Metcalf et al. |
| 2011/0050164 A1* | 3/2011 | Partovi et al. ............. 320/108 |
| 2011/0050166 A1 | 3/2011 | Cook et al. |
| 2011/0188677 A1* | 8/2011 | Rothkopf et al. ............. 381/150 |
| 2012/0013292 A1* | 1/2012 | Ali et al. ............. 320/108 |

FOREIGN PATENT DOCUMENTS

| | | |
|---|---|---|
| JP | 2010-63245 A | 3/2010 |
| JP | 2010252468 A | 11/2010 |
| JP | 2010273441 A | 12/2010 |
| KR | 10-2008-0106186 A | 12/2008 |
| KR | 10-2009-0006263 A | 1/2009 |
| KR | 10-2009-0056546 A | 6/2009 |
| RU | 2342761 C1 | 12/2008 |
| RU | 2400932 C2 | 9/2010 |
| RU | 2403154 C2 | 11/2010 |
| WO | WO 2006001557 A1 * | 1/2006 |
| WO | 2009052167 A2 | 4/2009 |
| WO | 2010093724 A1 | 8/2010 |
| WO | 2010129369 A2 | 11/2010 |

OTHER PUBLICATIONS

Bingnan Wang, Tamotsu Nishino, Koon Hoo Teo, Wireless Power Transmission Efficiency Enhancement with Metamaterials, Mitsubishi electric laboratories, Sep. 2010.*
Communication, dated May 17, 2013, issued by the European Patent Office in counterpart European Application No. 12150084.7.
Cannon, B. et al: "Magnetic Resonant Coupling as a Potential Means for Wireless Power Transfer to Multiple Small Receivers", IEEE Transactions on Power Electronics, IEEE Services Center, Piscataway, NJ, US, vol. 24, No. 7, Jul. 1, 2009, pp. 1819-1825.
International Search Report (PCT/ISA/210), dated Jul. 2, 2012, issued by the International Searching Authority in counterpart International Application No. PCT/KR2012/000024.
Written Opinion (PCT/ISA/237), dated Jul. 2, 2012, issued by the International Searching Authority in counterpart International Application No. PCT/KR2012/000024.
Communication, dated Mar. 6, 2014, issued by the European Patent Office in counterpart European Application No. 12 150 084.7.
Communication, Issued by the State Intellectual Property Office of P.R. China, Dated Dec. 23, 2014, in counterpart Chinese Application No. 201210005564.5.
Communication dated Sep. 8, 2015, issued by the Japanese Patent Office in counterpart Japanese Application No. 2011-288196.
Communication dated Nov. 25, 2015, issued by the Australian Patent Office in counterpart Australian Application No. 2012205088.
Communication dated Oct. 26, 2015, issued by the Russian Patent Office in counterpart Russian Application No. 2013136380/07.

* cited by examiner

WIRELESS POWER TRANSMISSION APPARATUS AND SYSTEM FOR WIRELESS POWER TRANSMISSION THEREOF

CROSS-REFERENCE TO RELATED APPLICATIONS

This application claims the benefit under 35 U.S.C. §119 from U.S. Provisional Application No. 61/429,294, filed on Jan. 3, 2011 in the United States Patent and Trademark Office, and Korean Patent Application No. 10-2011-0020504, filed on Mar. 8, 2011 in the Korean Intellectual Property Office, the disclosure of which is incorporated herein by reference in its entirety.

BACKGROUND

1. Field

Methods and apparatuses consistent with exemplary embodiments relate to a wireless power transmission apparatus and a wireless power transmission system thereof, and more particularly, to a wireless power transmission apparatus which charges an external apparatus wirelessly using a resonator, and a wireless power transmission system thereof.

2. Description of the Related Art

In recent years, a display apparatus provides not only a two-dimensional (2D) image but also a stereoscopic three-dimensional (3D) image. In particular, the display apparatus for viewing the stereoscopic 3D image may be a glasses-type display apparatus using special glasses or a non-glasses type display apparatus which does not use special glasses.

In a glasses-type display apparatus utilizing a shutter glass method, a left-eye glass and a right-eye glass of 3D glasses should be turned on or off alternately according to a synchronization signal transmitted from the display apparatus in order to provide the stereoscopic 3D image. That is, in order to provide the 3D image, power needs to be supplied to the 3D glasses.

To supply power to the 3D glasses, a disposable battery method which utilizes a disposable battery and a charging method which utilizes a rechargeable battery are provided. With the disposable battery method, the disposable is frequently replaced as it becomes drained and thus can be costly. With the charging method, a cable is required to charge the 3D glasses and thus is inconvenient, and also, this method has a weakness from the perspective of aesthetic appearance.

Accordingly, there is a need for a method for charging 3D glasses more easily and more efficiently.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiment provides a wireless power transmission apparatus which charges 3D glasses more easily and more efficiently, and a wireless power transmission system thereof.

According to an aspect of an exemplary embodiment, there is provided a wireless power transmission apparatus including a main body; and a support which is disposed on a side surface of the main body, wherein the main body includes a transmission resonator unit which generates a horizontal magnetic field with respect a ground surface and a vertical magnetic field with respect to the ground surface.

The transmission resonator unit may include a transmission conductive wire loop which provides a vertical magnetic field to a second power reception apparatus placed on the main body, and the second power reception apparatus may include a second reception conductive wire loop in which a loop surface is perpendicular to the vertical magnetic field.

The main body may have a cylindrical shape.

The support may have a disk shape.

The transmission conductive wire loop may have a cylindrical shape.

The transmission conductive wire loop may be formed in a cylindrical shape by being bent circularly.

The transmission resonator unit may further include a resonance capacitor and a feeder conductive wire loop which induces electric current to the transmission conductive wire loop.

The wireless power transmission apparatus may have transmission efficiency which is proportional to Root $(Qs*Qd)$, where Qs is a Q value of the power transmission apparatus and Qd is a Q value of the power reception apparatus.

The transmission resonator unit may have a resonant frequency ranging from 1 MHz to 30 MHz.

The transmission resonator unit may have a variable resonant frequency.

The RF amplifier unit may have a variable operating frequency.

The transmission conductive wire loop may be in contact with an inner edge of the main body.

The transmission conductive wire loop may generate a vertical magnetic field and a horizontal magnetic field simultaneously.

The wireless power transmission apparatus may further include a shielding member between the RF amplifier unit and the transmission resonator unit.

The shielding member may be a ferrite sheet.

The RF amplifier unit may be enclosed by a shield case.

The shield case may be formed by tinning.

The wireless power transmission apparatus may be formed to have a predetermined gap between the RF amplifier unit and the transmission resonator unit.

The first power reception apparatus may be one of 3D glasses, a mobile phone, and a remote controller.

The second power reception apparatus may be one of 3D glasses, a mobile phone, and a remote controller.

According to an aspect of another exemplary embodiment, there is provided a wireless power transmission system, including: a power transmission apparatus which generates a vertical magnetic field and a horizontal magnetic field with respect to a ground surface; a first power reception apparatus which includes a first reception conductive wire loop that is activated by the horizontal magnetic field to charge the first power reception apparatus; and a second power reception apparatus which includes a second reception conductive wire loop that is activated by the vertical magnetic field to charge the second power reception apparatus.

The power transmission apparatus may include: a main body which includes a transmission resonator; and a support which is disposed on a side surface of the main body, and the transmission resonator may provide the horizontal magnetic field to the first power reception apparatus placed on the support.

The transmission resonator may provide the vertical magnetic field to the second power reception apparatus placed on the main body.

The power transmission apparatus may include a cylindrical transmission conductive wire loop.

The power transmission apparatus may include a transmission conductive wire loop which is formed in a cylindrical shape by being bent circularly.

The power transmission apparatus may further include a resonance capacitor and a feeder conductive wire loop which induces electric current to the transmission conductive wire loop.

The wireless power transmission system may have transmission efficiency which is proportional to Root (Qs*Qd), where Qs is a Q value of the power transmission apparatus and Qd is a Q value of the power reception apparatus.

The power transmission apparatus may have a resonant frequency ranging from 1 MHz to 30 MHz.

The power transmission apparatus may have a variable resonant frequency.

The power transmission apparatus may include an RF amplifier unit having a variable operating frequency.

The power transmission apparatus may further include: an RF amplifier unit; a transmission conductive wire loop; and a shielding member which is disposed between the RF amplifier unit and the transmission conductive wire loop.

The shielding member may be a ferrite sheet.

The RF amplifier unit may be enclosed by a shield case.

The shield case may be formed by tinning.

The power transmission apparatus may be formed to have a predetermined gap between the RF amplifier unit and the transmission resonator unit.

The first power reception apparatus may be one of 3D glasses, a mobile phone, and a remote controller.

The second power reception apparatus may be one of 3D glasses, a mobile phone, and a remote controller.

The power transmission apparatus may include a disk type support to accommodate the first power reception apparatus.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 1:
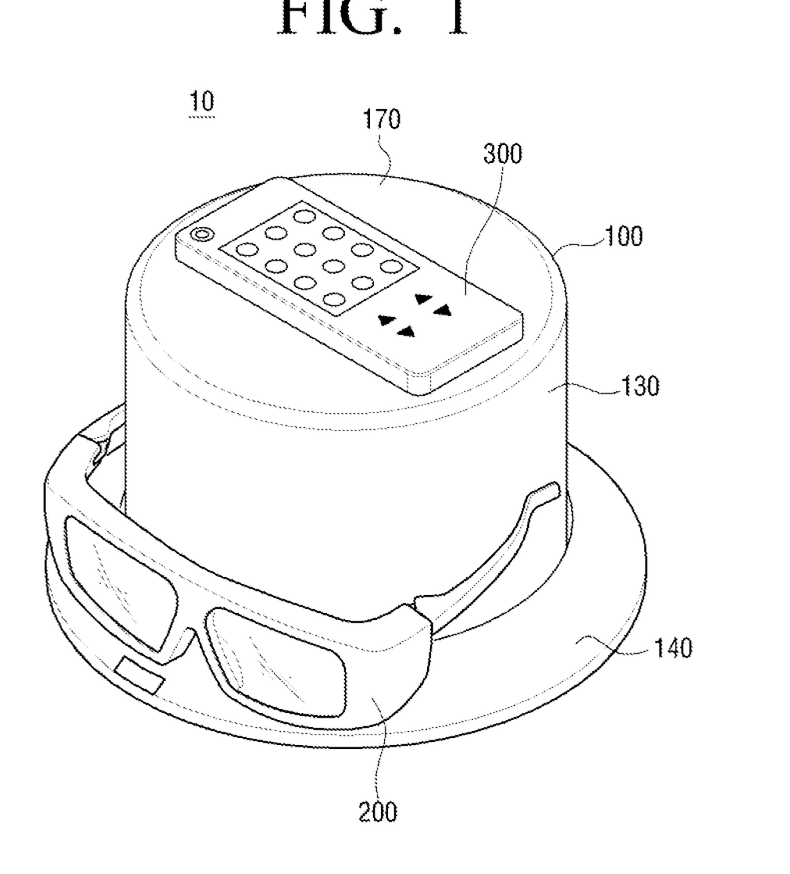
FIG. 1 is a view illustrating a wireless power transmission system according to an exemplary embodiment.

FIG. 1 is a view illustrating a wireless power transmission system according to an exemplary embodiment. The wireless power transmission system 10 according to an exemplary embodiment includes a power transmission apparatus 100, a first power reception apparatus 200, and a second power reception apparatus 300.

The power transmission apparatus 100 transmits magnetic energy to the first wireless power reception apparatus 200 and the second wireless power reception apparatus 300 wirelessly using a transmission resonator (described in detail below with reference to FIGS. 2A and 2B).

More specifically, the power transmission apparatus 100 generates a magnetic field of a horizontal direction and a magnetic field of a vertical direction with respect to a ground surface using the transmission resonator which is formed in a cylindrical shape. The power transmission apparatus 100 charges the first power reception apparatus 200 placed on a support 140 of the power transmission apparatus 100 using the magnetic field of the horizontal direction and charges the second power reception apparatus 300 placed on a top surface 170 of a main body 130 of the power transmission apparatus 100 using the magnetic field of the vertical direction.

In particular, the cylindrical main body 130 includes a transmission resonator including a cylindrical transmission conductive wire loop to generate the magnetic field of the horizontal direction and the magnetic field of the vertical direction simultaneously.

Figure 2A:
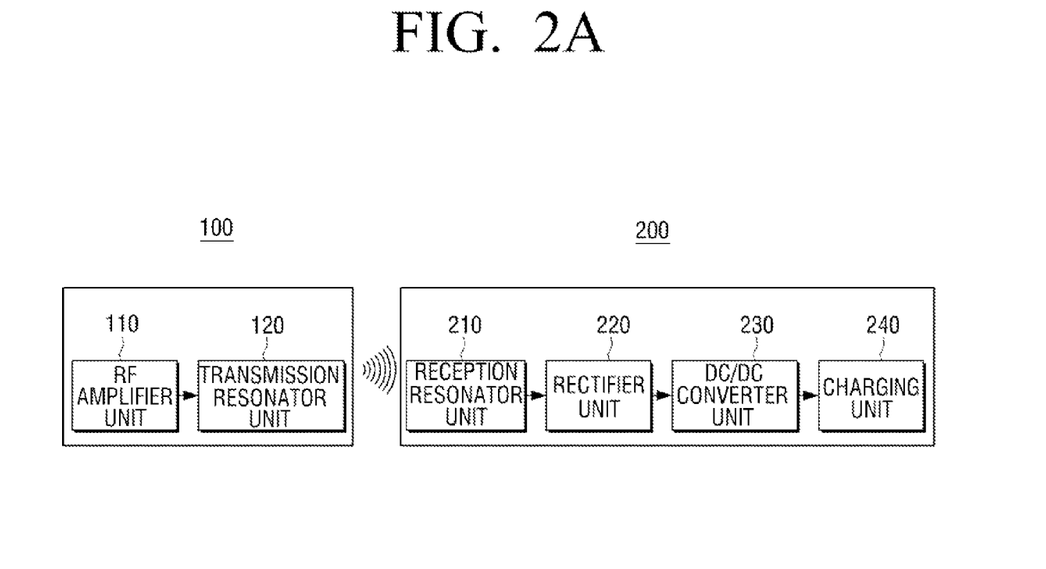
FIG. 2A is a block diagram illustrating a wireless power transmission system according to an exemplary embodiment.

The first power reception apparatus 200 is charged using the magnetic energy transmitted from the power transmission apparatus 100 using a reception resonator (described in detail below with reference to FIGS. 2A and 2C). More specifically, the first power reception apparatus 200 is charged using the magnetic field of the horizontal direction generated by the transmission resonator of the power transmission apparatus 100. The reception resonator of the first power reception apparatus 200 includes a first reception conductive wire loop in which a loop surface is perpendicular to the magnetic field of the horizontal direction. Herein, the loop surface is a surface formed by a reception conductive wire loop.

The first power reception apparatus 200 may be 3D glasses but is not limited to this. For example, the first power reception apparatus 200 may be a remote controller or a mobile phone. If the remote controller or the mobile phone is placed on the support 140, the remote controller or the mobile phone is charged by placing a loop surface of a reception conductive wire loop of the remote controller or the mobile phone perpendicularly to the magnetic field of the horizontal direction.

The second power reception apparatus 300 is charged using the magnetic energy transmitted from the power transmission apparatus 100 using a reception resonator. More specifically, the second power reception apparatus 300 is charged using the magnetic field of the horizontal direction generated by the transmission resonator of the power transmission apparatus 100. The reception resonator of the second power reception apparatus 300 includes a second reception conductive wire loop in which a loop surface is perpendicular to the magnetic field of the vertical direction.

The second power reception apparatus 300 may be a remote controller or a mobile phone, but is not limited to this. For example, the second power reception apparatus 300 may be 3D glasses. If 3D glasses are placed on the top surface of the main body, the 3D glasses are charged by placing a loop surface of a reception conductive wire loop of the 3D glasses perpendicularly to the magnetic field of the vertical direction.

The power transmission apparatus 100, the first power reception apparatus 200, and the second power reception apparatus 300 may have a high resonance Q-factor. This is because energy reception efficiency increases as the Q-factor of the power transmission apparatus 100 and the power reception apparatuses 200 and 300 increases. In particular, the wireless power transmission system 10 may have transmission efficiency proportional to Root(Qs*Qd), where Qs is a Q value of the power transmission apparatus and Qd is a Q value of the power reception apparatus. Also, the power transmission apparatus 100 and the power reception apparatuses 200 and 300 may include a loop type resonator to have a high Q-factor and may be configured as a high quality and low loss capacitor (that is, a capacitor with a low resistance lead wire) in order to. Also, since the Q value abruptly decreases when the power transmission apparatus 100 and the power reception apparatuses 200 and 300 are in the vicinity of metal material, the power transmission apparatus 100 and the power reception apparatuses 200 and 300 may include a shielding structure.

Hereinafter, a method for wirelessly charging of the wireless power transmission system 10 will be explained with reference to FIGS. 2A, 2B and 2C.

As described above, the wireless power transmission system 10 includes the power transmission apparatus 100 and the first power reception apparatus 200. The power transmission apparatus 100 includes a radio frequency (RF) amplifier unit 110 and a transmission resonator unit 120.

The RF amplifier unit 110 generates an alternating current (AC) waveform of a high frequency using a DC voltage transmitted from a power supply unit (not shown), and generates a magnetic field concentrated on a resonant frequency. Also, the RF amplifier unit 110 generates the AC waveform of the high frequency (MHz level) and excites the AC waveform to the transmission resonator unit 120. At this time, the RF amplifier unit 110 has a specific operating frequency which is variable.

The specific operating frequency of the RF amplifier unit 110 is identical to the resonant frequency of the magnetic field generated at the transmission resonator unit 120, and the operating frequency of the RF amplifier unit 110 may be 13.65 MHz, for example. However, this is merely an example and the operating frequency of the RF amplifier unit 110 may range from 1 MHz to 30 MHz. If the power transmission apparatus 100 has the operating frequency of 1~30 MHz, the power transmission apparatus 100 may have a small resonator and a high Q-factor, and, if the power transmission apparatus 100 does not have the operating frequency of 1~30 MHz, the transmission efficiency abruptly decreases because of limitation of a power element and thus the power transmission apparatus 100 is inefficient.

Figure 2B:
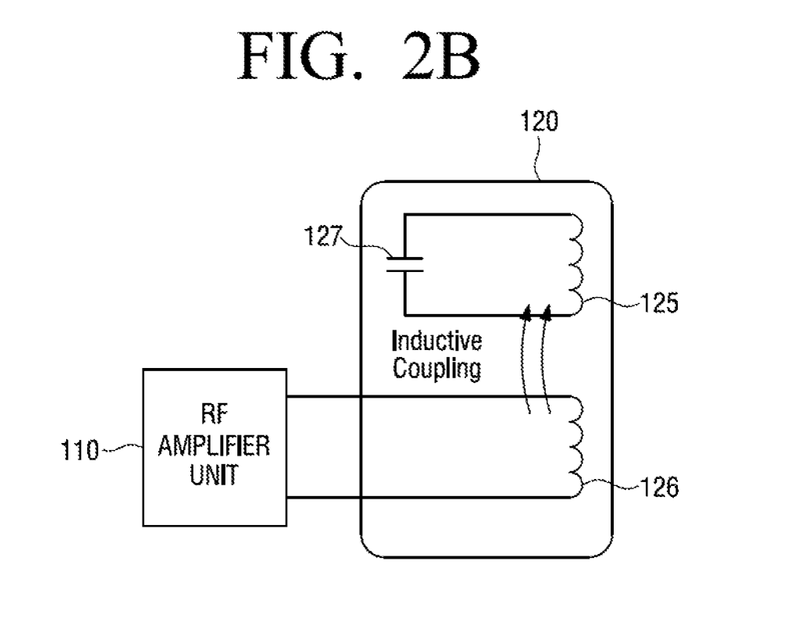
FIG. 2B is a block diagram illustrating a transmission resonator unit according to an exemplary embodiment.
Figure 2C:
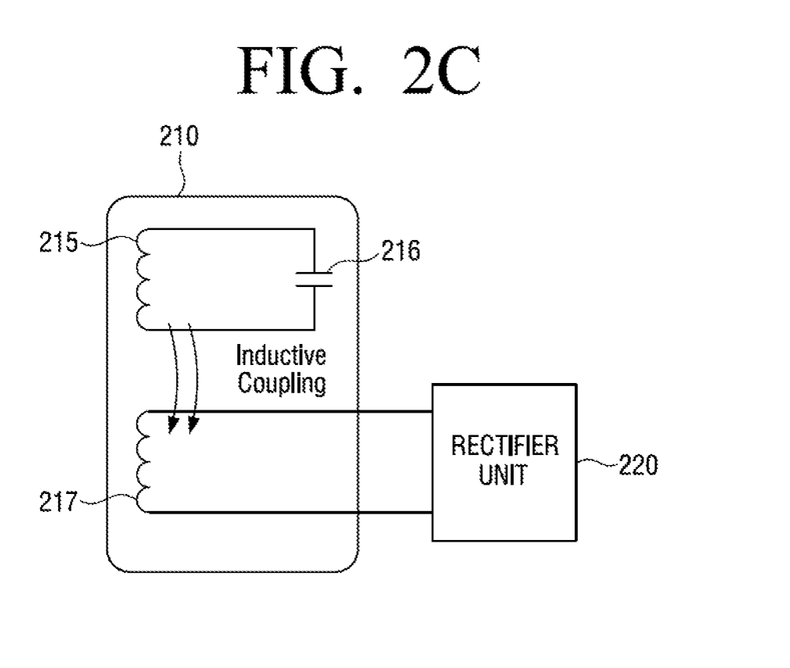
FIG. 2C is a block diagram illustrating a reception resonator unit according to an exemplary embodiment.

As shown in FIG. 2B, the transmission resonator unit 120 generates magnetic energy to be transmitted to the first power reception apparatus 200. More specifically, the transmission resonator unit 120 includes a feeder conductive wire loop 126, a transmission conductive wire loop 125 and a resonance capacitor 127.

The feeder conductive wire loop 126 induces electric current to the transmission conductive wire loop 125 which is connected in the form of inductive coupling, and induces generation of a magnetic field concentrated on the resonant frequency. At this time, the resonant frequency may be 13.65 MHz as described above. However, this is merely an example and the operating frequency of the RF amplifier unit 110 may range from 1 MHz to 30 MHz.

The transmission conductive wire loop 125 generates the magnetic field concentrated on the resonant frequency. At this time, the transmission conductive wire loop 125 may be formed in a cylindrical shape in order to generate the magnetic field parallel to the ground surface and the magnetic field perpendicular to the ground surface. In particular, the transmission conductive wire loop may be formed by being bent circularly. The transmission conductive wire loop 125 may be formed in contact with an inner edge or surface of the main body 130. The magnetic field generated by the transmission conductive wire loop 125 will be explained below with reference to FIGS. 4A to 4C.

The transmission resonator unit 120 is an LC resonator and changes the resonant frequency by changing values of a resonance capacitor and an inductor.

The power transmission apparatus 100 may include a shielding member to prevent an Eddy field phenomenon in which the Q-factor abruptly decreases, if the power transmission apparatus 100 is in the vicinity of metal material. The shielding member of the power transmission apparatus 100 will be explained below with reference to FIG. 5.

As described above, the power transmission apparatus 100 transmits the magnetic energy generated by the transmission resonator unit to the power reception apparatuses 200 and 300 wirelessly.

Also, the power reception apparatus 200 includes a reception resonator unit 210, a rectifier unit 220, a DC/DC converter unit 230, and a charging unit 240, as shown in FIG. 2.

The reception resonator unit 210 receives a magnetic energy concentrated on a specific frequency. More specifically, as shown in FIG. 2C, the reception resonator unit 210 includes a reception conductive wire loop 215 formed on an edge of the power reception apparatus 200 (for example, 3D glasses), a resonance capacitor 216 connected to the reception conductive wire loop, and a pickup conductive wire loop 217. For example, if the power reception apparatus 200 is 3D glasses, the reception conductive wire loop 215 may be formed in a rim of the 3D glasses, and, if the power reception apparatus 200 is a remote controller or a mobile phone, the reception conductive wire loop 215 may be formed in an edge of the remote controller or the mobile phone. However, this is merely an example and the reception conductive wire loop 215 may be formed in different positions of the 3D glasses, the remote controller, and the mobile phone. The reception conductive wire loop 215 may be formed using a printed circuit board (PCB) or a film PCB.

The reception resonator unit 210 is activated by the magnetic field of the resonant frequency generated by the transmission resonator unit 120 so that electric current flows in the reception conductive wire loop 215. At this time, the reception conductive wire loop 215 is activated by being placed perpendicularly to the magnetic field of the horizontal direction or the magnetic field of the vertical direction generated by the transmission resonator unit 120. More specifically, if the power reception apparatus 200 is placed on the support 140, the reception conductive wire loop 215 is activated by being placed perpendicularly to the magnetic field of the horizontal direction generated by the transmission resonator unit 120. Also, if the power reception apparatus 200 is placed on the top surface 170 of the main body 130, the reception conductive wire loop 215 is activated by being placed perpendicularly to the magnetic field of the vertical direction generated by the transmission resonator unit 120.

The pickup conductive wire loop 217 induces electric current generated in the reception conductive wire loop 215, and provides the electric current to the rectifier unit 220.

The rectifier unit 220 rectifies an AC voltage transmitted from the pickup conductive wire loop into a DC voltage. The rectifier unit 220 may include a bridge diode including four diodes and a capacitor serving as a filter as known in the related art. However, this is merely an example and the rectifier unit 220 may be realized using a different circuit rectifying an AC input into a DC output.

Since the DC voltage rectified by the rectifier unit 220 does not maintain a constant voltage, the DC/DC converter unit 230 adjusts the DC voltage to be constant.

The charging unit 240 charges a battery with the rectified constant voltage. In particular, the charging unit 240 may include a charging integrated circuit (IC) and a battery to control a charging operation using the output voltage of the rectifier unit 220.

Hereinafter, the power transmission apparatus 100 will be explained in detail with reference to FIGS. 3 and 4.

Figure 3:
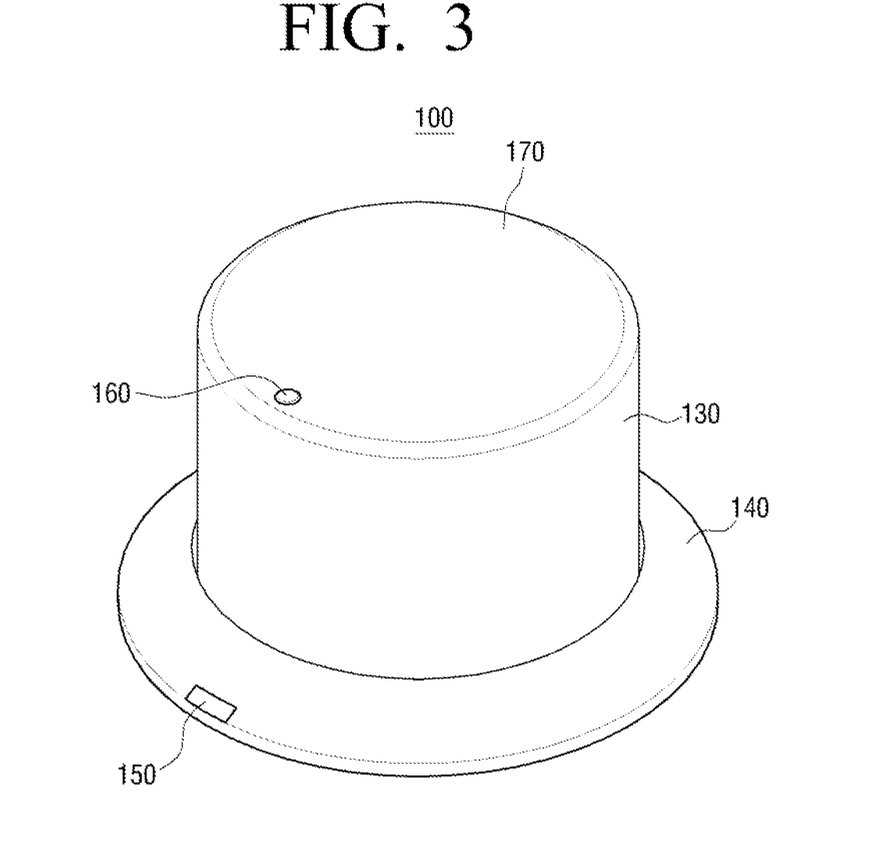
FIG. 3 is a view illustrating a wireless power transmission apparatus according to an exemplary embodiment.

FIG. 3 is a view illustrating an exterior configuration of the power transmission apparatus 100 according to an exemplary embodiment. As shown in FIG. 3, the power transmission apparatus 100 includes the main body 130, the support 140, a display unit 150, and a power button unit 160.

The main body 130 accommodates the transmission resonator unit 120 of the power transmission apparatus 100. In particular, as shown in FIG. 3, the main body 130 may be formed in a cylindrical shape to accommodate the cylindrical reception resonator unit 120. The main body 130 includes the flat top surface 170 on which the second power reception apparatus 300 is placed. Accordingly, the second power reception apparatus 300 is placed on the top surface of the main body 130 so that the second power reception apparatus 300 can be wirelessly charged by the magnetic field of the vertical direction.

The support 140 is formed on a side surface of the main body 130. As shown in FIG. 3, an edge of the support 140 includes the display unit 150 to inform of a power on/off state of the power transmission apparatus 100. The support 140 may have a disk shape to accommodate the first power reception apparatus 200. Accordingly, the first power reception apparatus 200 is placed on the support 140 so that the first power reception apparatus 200 can be wirelessly charged by the magnetic field of the horizontal direction.

Also, the power transmission apparatus 100 includes the power button unit 160 to control power supply according whether or not the power reception apparatuses 200 and/or 300 are charged.

Figure 4A:
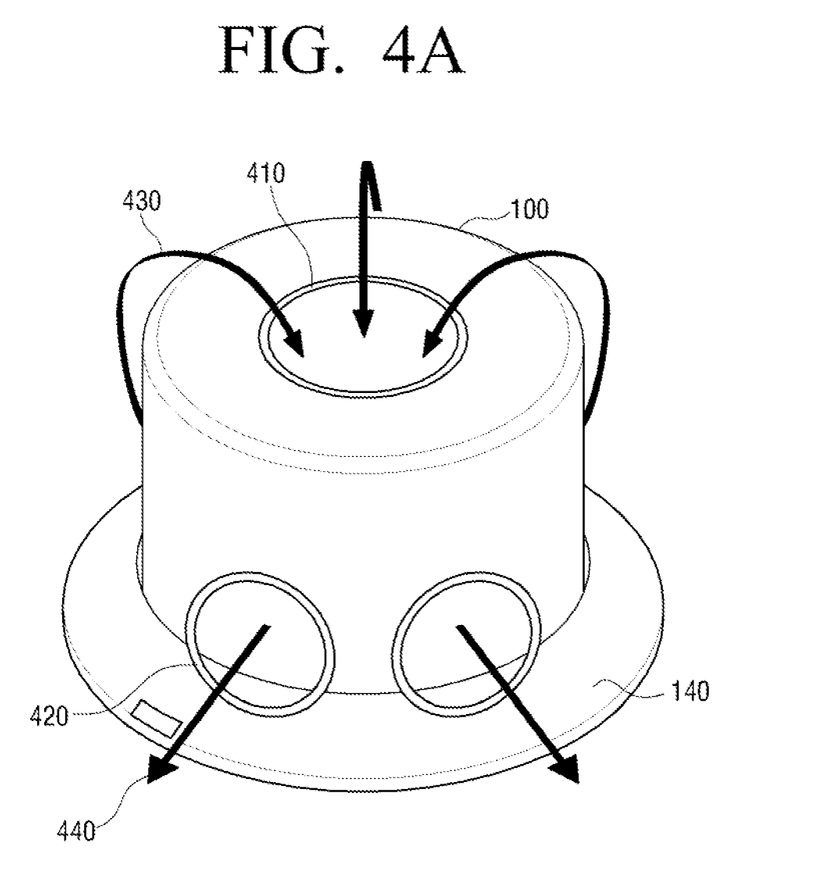
FIGS. 4A to 4C are views to explain magnetic fields of the wireless power transmission apparatus according to an exemplary embodiment.
Figure 4B:
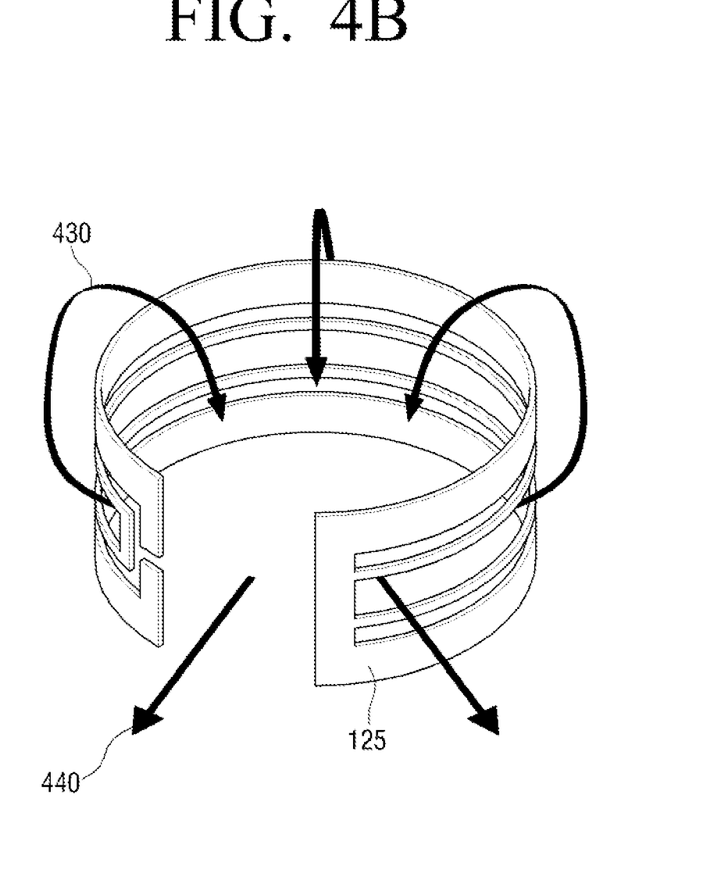
Figure 4C:
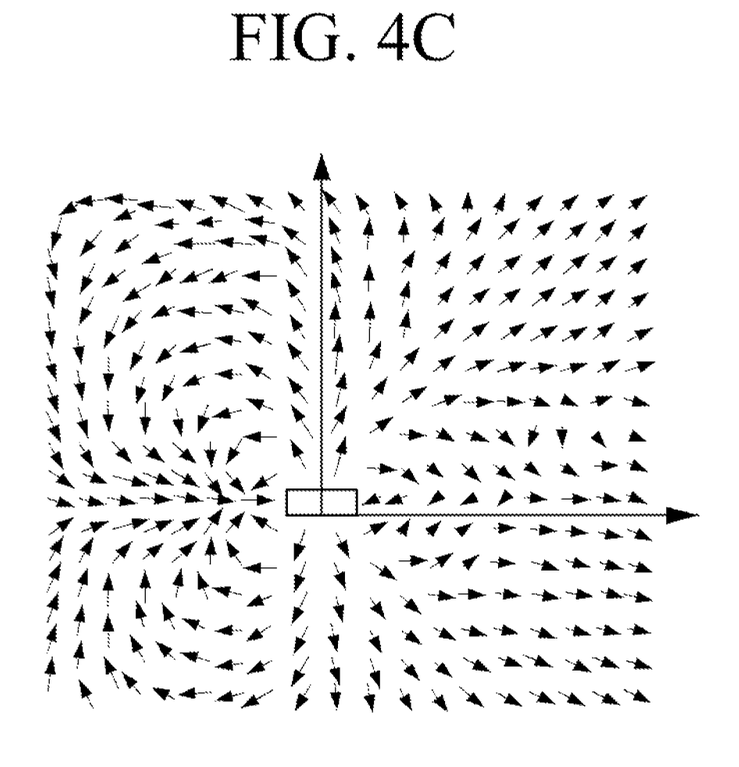

FIGS. 4A to 4C are views illustrating the magnetic fields generated by the power transmission apparatus 100 according to an exemplary embodiment.

As shown in FIG. 4A, the cylindrical power transmission apparatus 100 generates a magnetic field 430 of a vertical direction and a magnetic field 440 of a horizontal direction. Accordingly, the magnetic field 430 of the vertical direction is perpendicular to a loop surface 410 of the reception conductive loop of the second power reception apparatus 300 so that the second power reception apparatus 300 is charged. Also, the magnetic field 440 of the horizontal direction is perpendicular to a loop surface 420 of the reception conductive loop of the first power reception apparatus 200 so that the first power reception apparatus 200 is charged.

FIG. 4B is a view illustrating the transmission resonator unit 120 included in the power transmission apparatus 100 shown in FIG. 4A. As described above, the transmission resonator unit 120 includes a transmission conductive wire loop 125 formed in a cylindrical shape in order for the power transmission apparatus 100 to generate the magnetic field 430 of the vertical direction and the magnetic field 440 of the horizontal direction.

FIG. 4C is a view illustrating the magnetic field of the cylindrical transmission resonator unit 120. As shown in FIG. 4C, the magnetic field of the cylindrical transmission resonator unit 120 is formed in a direction perpendicular to a top surface and a side surface.

If the power transmission apparatus 100 is placed on a metal table, an Eddy current effect in which the resonant frequency of the transmission resonator unit 120 is shifted or the Q-factor decreases occurs due to the metal table. Accordingly, the power transmission apparatus 100 may include a shielding structure to prevent a phenomenon in which charging performance of the power transmission apparatus 100 deteriorates due to the metal table. Hereinafter, the shielding structure of the power transmission apparatus 100 will be explained with reference to FIG. 5.

Figure 5:
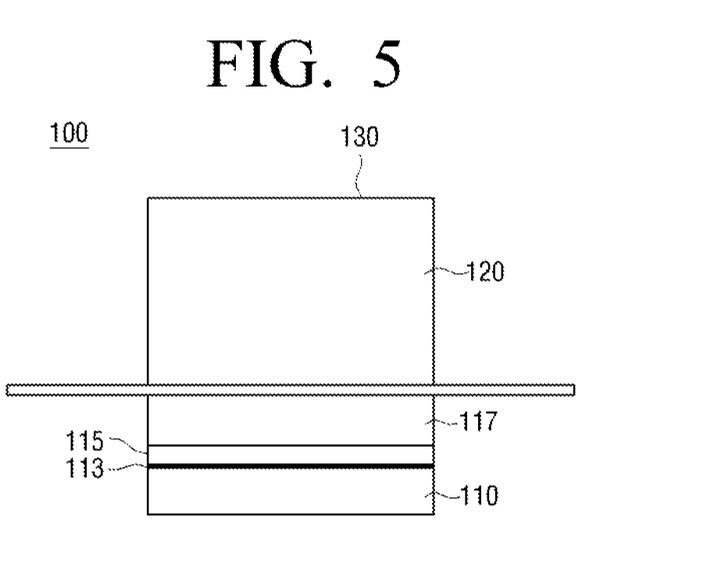
FIG. 5 is a view to explain a shielding structure of the wireless power transmission apparatus according to an exemplary embodiment.

FIG. 5 is a view illustrating the power transmission apparatus 100 including the shielding structure according to an exemplary embodiment. The RF amplifier unit 110 and the transmission resonator unit 120 shown in FIG. 5 are the same as described above with reference to FIG. 2.

The RF amplifier unit 110 of the power transmission apparatus 100 is enclosed by a shield case 113 to prevent the eddy current effect. The shield case 113 may be formed by tinning.

The power transmission apparatus 100 may further include a shielding member 115 between the RF amplifier unit 110 and the transmission resonator unit 120. The shielding member 115 may be realized by a ferrite sheet. The shielding member 115 guarantees a low-resistance path, thereby compensating for most of the Q-factors.

Also, a predetermined gap 117 may be provided between the RF amplifier unit 110 and the transmission resonator unit 120 to prevent the resonant frequency from changing in advance.

The Eddy current phenomenon in which the resonant frequency is changed and the Q-factor decreases is prevented by the shield case 113, the shielding member 115, and the gap 117.

In the above embodiment, the reception conductive wire loop is perpendicular to the magnetic field generated at the transmission resonator unit 120. However, this is merely an example and the reception conductive wire loop may be placed at a different angle. That is, the reception conductive wire loop being perpendicular to the magnetic field merely means that the energy reception efficiency is highest. The inventive concept may be implemented at a different angle (close to a right angle).

As described above, the plurality of power reception apparatuses (the 3D glasses, the remote controller, and the mobile phone) are charged by the single power transmission apparatus and thus the user can charge various apparatuses more easily and more efficiently.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A wireless power transmission apparatus comprising:
   a main body which has a cylindrical shape of a predetermined height; and a support which is disposed on a side surface of the main body, wherein the main body comprises a transmission resonator unit which generates a horizontal magnetic field with respect a ground surface and a vertical magnetic field with respect to the ground surface using a transmission conductive wire loop which has a cylindrical shape, wherein the support is configured to support a first power reception apparatus so that the first power reception apparatus is charged by the horizontal magnetic field when the first power reception apparatus is placed on the support and the main body has a top surface configured to support a second power reception apparatus so the second power reception apparatus is provided with the vertical magnetic field when the second power reception apparatus is placed on the top surface, wherein the first power reception apparatus is charged by placing a loop surface of a reception conductive wire loop of the first power reception apparatus perpendicular to the horizontal magnetic field, and the second power reception apparatus is charged by placing a loop surface of a reception conductive wire loop of the second power reception apparatus perpendicular to the vertical magnetic field, wherein the reception conductive wire loop is formed on an edge of the first power reception apparatus, and wherein the transmission conductive wire loop is formed in the cylindrical shape by being bent circularly.

2. The wireless power transmission apparatus as claimed in claim 1, wherein the main body has a cylindrical shape.

3. The wireless power transmission apparatus as claimed in claim 1, wherein the support has a disk shape.

4. The wireless power transmission apparatus as claimed in claim 1, wherein the transmission resonator unit further comprises a resonance capacitor and a feeder conductive wire loop which induces electric current to the transmission conductive wire loop.

5. The wireless power transmission apparatus as claimed in claim 1, wherein the wireless power transmission apparatus has a transmission efficiency which is proportional to Root (Qs*Qd), where Qs is a Q value of the power transmission apparatus and Qd is a Q value of a power reception apparatus.

6. The wireless power transmission apparatus as claimed in claim 1, wherein the transmission resonator unit has a resonant frequency ranging from 1 MHz to 30 MHz.

7. The wireless power transmission apparatus as claimed in claim 1, wherein the transmission resonator unit has a variable resonant frequency.

8. The wireless power transmission apparatus as claimed in claim 1, wherein the transmission conductive wire loop is in contact with an inner edge of the main body.

9. The wireless power transmission apparatus as claimed in claim 1, wherein the transmission conductive wire loop generates the horizontal and vertical magnetic fields simultaneously.

10. The wireless power transmission apparatus as claimed in claim 1, further comprising a radio frequency (RF) amplifier unit which generates an alternating current (AC) waveform, wherein the transmission resonator unit receives the AC waveform generated by the RF amplifier unit and generates the horizontal and vertical magnetic field in response to the AC waveform.

11. The wireless power transmission apparatus as claimed in claim 10, wherein the RF amplifier unit has a variable operating frequency.

12. The wireless power transmission apparatus as claimed in claim 10, further comprising a shielding member interposed between the RF amplifier unit and the transmission resonator unit.

13. The wireless power transmission apparatus as claimed in claim 12, wherein the shielding member is a ferrite sheet.

14. The wireless power transmission apparatus as claimed in claim 10, further comprising a shield case which encloses the RF amplifier unit.

15. The wireless power transmission apparatus as claimed in claim 14, wherein the shield case is formed by tinning.

16. The wireless power transmission apparatus as claimed in claim 10, wherein the RF amplifier unit and the transmission resonator unit are separated by a predetermined gap.

17. A wireless power transmission system comprising:
a power transmission apparatus which generates a vertical magnetic field and a horizontal magnetic field with respect to a ground surface;
a first power reception apparatus which comprises a first reception conductive wire loop that is activated by the horizontal magnetic field to charge the first power reception apparatus; and
a second power reception apparatus which comprises a second reception conductive wire loop that is activated by the vertical magnetic field to charge the second power reception apparatus,
wherein the power transmission apparatus comprises a cylindrical transmission conductive wire loop which generates the vertical magnetic field and the horizontal magnetic field,
wherein the first reception conductive wire loop of the first power reception apparatus is activated by the horizontal magnetic field to charge the first power reception apparatus when the first power reception apparatus is placed on the power transmission apparatus so that a loop surface of the first power reception conductive wire loop is perpendicular to the horizontal magnetic field, and the second reception conductive wire loop of the second power reception apparatus is activated by the vertical magnetic field to charge the second power reception apparatus when second power reception apparatus is placed on the power transmission apparatus so that a loop surface of the second power reception conductive wire loop is perpendicular to the vertical magnetic field, and
wherein the first reception conductive wire loop is formed on an edge of the first power reception apparatus, and
wherein the power transmission apparatus comprises the transmission conductive wire loop which is formed in a cylindrical shape by being bent circularly.

18. The wireless power transmission system as claimed in claim 17, wherein the power transmission apparatus comprises:
a main body which comprises a transmission resonator which generates the vertical magnetic field and the horizontal magnetic field; and
a support which is disposed on a side surface of the main body, and is configured to support the first power reception apparatus so that first power reception apparatus is provided with the horizontal magnetic field when the first power reception apparatus is placed on the support.

19. The wireless power transmission system as claimed in claim 18, wherein the main body has a top surface configured to support the second power reception apparatus so the second power reception apparatus is provided with the vertical magnetic field of the vertical direction when the second power reception apparatus is placed on the top surface.

20. The wireless power transmission system as claimed in claim 17, wherein the power transmission apparatus further comprises a resonance capacitor and a feeder conductive wire loop which induces electric current to the transmission conductive wire loop.

21. The wireless power transmission system as claimed in claim 17, wherein the wireless power transmission apparatus has a transmission efficiency which is proportional to Root (Qs*Qd), where Qs is a Q value of the power transmission apparatus and Qd is a Q value of the first or second power reception apparatus.

22. The wireless power transmission system as claimed in claim 17, wherein the power transmission apparatus has a resonant frequency ranging from 1 MHz to 30 MHz.

23. The wireless power transmission system as claimed in claim 17, wherein the power transmission apparatus has a variable resonant frequency.

24. The wireless power transmission system as claimed in claim 17, wherein the power transmission apparatus comprises a radio frequency (RF) amplifier unit having a variable operating frequency.

25. The wireless power transmission system as claimed in claim 17, wherein the power transmission apparatus comprises:
   a radio frequency (RF) amplifier unit which generates an alternating current (AC) waveform;
   a transmission resonator unit comprising a transmission conductive wire loop which receives the AC waveform generated by the RF amplifier unit and generates the horizontal and vertical magnetic fields; and
   a shielding member which is disposed between the RF amplifier unit and the transmission conductive wire loop.

26. The wireless power transmission system as claimed in claim 25, wherein the shielding member is a ferrite sheet.

27. The wireless power transmission system as claimed in claim 25, wherein the RF amplifier unit is enclosed by a shield case.

28. The wireless power transmission system as claimed in claim 27, wherein the shield case is formed by tinning.

29. The wireless power transmission system as claimed in claim 25, wherein the RF amplifier unit and the transmission resonator unit are separated by a predetermined gap.

30. The wireless power transmission system as claimed in claim 17, wherein the first power reception apparatus is one of three-dimensional (3D) glasses, a mobile phone, and a remote controller.

31. The wireless power transmission system as claimed in claim 17, wherein the second power reception apparatus is one of three-dimensional (3D) glasses, a mobile phone, and a remote controller.

32. The wireless power transmission system as claimed in claim 17, wherein the support has a disk shape.

33. The wireless power transmission system as claimed in claim 17, wherein the power transmission apparatus generates the horizontal and vertical magnetic fields simultaneously.

34. A wireless power transmission system comprising:
   a power transmission apparatus which generates a first magnetic field parallel to a ground surface and a second magnetic field perpendicular to the ground surface;
   a first power reception apparatus which is charged by the first magnetic field when placed at a first position on the power transmission apparatus; and
   a second power reception apparatus which is charged by the second magnetic field when placed at a second position on the power transmission apparatus,
   wherein the power transmission apparatus comprises a cylindrical transmission conductive wire loop which generates the first magnetic field and the second magnetic field,
   wherein the first power reception apparatus comprises a first reception conductive wire loop that is activated by the first magnetic field to charge the first power reception apparatus when the first power reception apparatus is placed on the power transmission apparatus so that a loop surface of the first power reception conductive wire loop is perpendicular to the first magnetic field, and the second power reception apparatus comprises a second reception conductive wire loop that is activated by the second magnetic field to charge the second power reception apparatus when the second power reception apparatus is placed on the power transmission apparatus so that a loop surface of the second power reception conductive wire loop is perpendicular to the second magnetic field,
   wherein the first reception conductive wire loop is formed on an edge of the first power reception apparatus, and
   wherein the power transmission apparatus comprises the transmission conductive wire loop which is formed in a cylindrical shape by being bent circularly.

35. The wireless power transmission system as claimed in claim 34, wherein the power transmission apparatus comprises:
   a main body; and
   a support which is disposed on a side surface of the main body,
   wherein the main body comprises a transmission resonator unit which generates the first magnetic field and the second magnetic field.

36. The wireless power transmission system as claimed in claim 34, wherein the support is configured to support the first power reception apparatus so that first power reception apparatus is provided with the first magnetic field when the first power reception apparatus is placed on the support, and
   the main body has a top surface configured to support the second power reception apparatus so the second power reception apparatus is provided with the second magnetic field when the second power reception apparatus is placed on the top surface.

37. The wireless power transmission system as claimed in claim 34, wherein the loop surface of the first power reception conductive wire loop is a single closed loop.

\* \* \* \* \*